United States Patent
Poko et al.

(10) Patent No.: US 10,701,116 B2
(45) Date of Patent: *Jun. 30, 2020

(54) METHOD, COMPUTER-READABLE STORAGE DEVICE AND APPARATUS FOR ESTABLISHING PERSISTENT MESSAGING SESSIONS

(71) Applicant: AT&T Intellectual Property I, L.P., Atlanta, GA (US)

(72) Inventors: Mark Poko, Jamesburg, NJ (US); Gautham Chandra, Fords, NJ (US); Smeet Merchant, Edison, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/207,833

(22) Filed: Dec. 3, 2018

(65) Prior Publication Data

US 2019/0104164 A1    Apr. 4, 2019

Related U.S. Application Data

(63) Continuation of application No. 14/092,848, filed on Nov. 27, 2013, now Pat. No. 10,148,710.

(51) Int. Cl.
*H04L 29/06* (2006.01)
*G06F 16/9535* (2019.01)
(Continued)

(52) U.S. Cl.
CPC ........ *H04L 65/403* (2013.01); *G06F 16/9535* (2019.01); *G06Q 50/01* (2013.01);
(Continued)

(58) Field of Classification Search
CPC . H04L 65/403; H04L 65/1069; H04L 65/608; H04L 67/02; H04L 12/1818; G06F 16/9535; G06Q 50/01
See application file for complete search history.

(56) References Cited

U.S. PATENT DOCUMENTS 7,171,478 B2    1/2007  Lueckhoff et al.
7,454,462 B2   11/2008  Belfiore et al.
(Continued)

OTHER PUBLICATIONS

Wickramarachchi et al, "ANDES: a highly scalable persistent messaging system" http://people.apache.org/~hemapani/research/papers/mb2.pdf.
(Continued)

*Primary Examiner* — Robert W Beausoliel, Jr.
*Assistant Examiner* — Susan F Rayyan

(57) ABSTRACT

Creating a persistent messaging session includes providing a web application that enables browser-to-browser multimedia communications, creating the persistent messaging session in response to a request from a user, and setting the persistent messaging session to an idle state when all users have exited the persistent messaging session, wherein the idle state is monitored by the web application. Joining a persistent messaging session includes querying a server hosting a web application that supports and tracks a plurality of persistent messaging sessions, using a set of search criteria, receiving a set of search results from the server, wherein the search results indicate that the persistent messaging session satisfies the set of search criteria, and joining the persistent messaging session, where the joining allows the first endpoint device to exchange browser-to-browser multimedia communications directly with a second endpoint device.

20 Claims, 6 Drawing Sheets

(51) Int. Cl.
  *G06Q 50/00* (2012.01)
  *H04L 29/08* (2006.01)
  *H04L 12/18* (2006.01)

(52) U.S. Cl.
  CPC ...... *H04L 12/1818* (2013.01); *H04L 65/1069* (2013.01); *H04L 65/608* (2013.01); *H04L 67/02* (2013.01)

(56) References Cited

U.S. PATENT DOCUMENTS

| | | | |
|---|---|---|---|
| 7,644,118 B2 | 1/2010 | Phillips | |
| 7,739,235 B2* | 6/2010 | Rousseau | G06F 9/466 707/610 |
| 7,865,563 B2* | 1/2011 | Moudy | H04L 51/04 370/352 |
| 7,937,497 B2 | 5/2011 | Little | |
| 8,191,078 B1 | 5/2012 | Cullen et al. | |
| 8,275,905 B2 | 9/2012 | Xiao et al. | |
| 8,572,171 B1 | 10/2013 | Greenspan et al. | |
| 8,631,082 B2 | 1/2014 | Moudy | |
| 10,129,319 B2* | 11/2018 | Eriksson | H04L 67/02 |
| 2002/0198943 A1 | 12/2002 | Zhuang | |
| 2003/0101235 A1 | 5/2003 | Zhang | |
| 2004/0006601 A1 | 1/2004 | Bernstein et al. | |
| 2004/0041836 A1* | 3/2004 | Zaner | G06F 3/0481 715/751 |
| 2005/0132009 A1* | 6/2005 | Solie | H04L 12/1831 709/206 |
| 2005/0182817 A1 | 8/2005 | Andreev | |
| 2005/0207433 A1 | 9/2005 | Ni | |
| 2006/0020783 A1 | 1/2006 | Fisher | |
| 2006/0227943 A1* | 10/2006 | Yan | G06Q 10/10 379/67.1 |
| 2006/0282538 A1 | 12/2006 | Anglin | |
| 2007/0005707 A1* | 1/2007 | Teodosiu | G06Q 10/107 709/206 |
| 2007/0014284 A1 | 1/2007 | Daniels et al. | |
| 2007/0168448 A1* | 7/2007 | Garbow | H04L 12/1831 709/207 |
| 2007/0198647 A1* | 8/2007 | Lingafelt | H04L 12/1822 709/207 |
| 2007/0203998 A1* | 8/2007 | Demsky | G06Q 10/107 709/207 |
| 2007/0208809 A1* | 9/2007 | Westman | H04W 4/06 709/205 |
| 2008/0162633 A1 | 7/2008 | Scherpa | |
| 2008/0222295 A1 | 9/2008 | Robinson | |
| 2009/0083383 A1 | 3/2009 | Piper | |
| 2009/0106376 A1* | 4/2009 | Tom | G06Q 10/107 709/206 |
| 2009/0313336 A1 | 12/2009 | Haynes et al. | |
| 2009/0319615 A1 | 12/2009 | Caunter | |
| 2010/0057754 A1* | 3/2010 | Moudy | G06Q 20/382 707/E17.044 |
| 2010/0058203 A1 | 3/2010 | Moudy et al. | |
| 2010/0169455 A1 | 7/2010 | Gorham | |
| 2010/0198651 A1 | 8/2010 | Johnson et al. | |
| 2012/0059900 A1 | 3/2012 | Caunter et al. | |
| 2012/0179802 A1 | 7/2012 | Narasimhan et al. | |
| 2013/0073738 A1 | 3/2013 | Reisman | |
| 2013/0080558 A1 | 3/2013 | Moudy et al. | |
| 2013/0262574 A1 | 10/2013 | Cohen | |
| 2014/0280995 A1 | 9/2014 | Ezell | |

OTHER PUBLICATIONS

Risaris Ltd, "The SOA Gateway and MQ Persistent Messaging" Version 1—Draft (c) 2008 Risaris Limited http://www.google.com/url?

IBM, "Providing a messaging backbone for SOA connectivity" Service oriented architecture solutions White paper Websphere. software http://www.capitalware.biz/dl/docs/ibm_MQ_Messaging_Backbone_for_SOA.pdf.

Oracle, "Automatic Service Migration in WebLogic Server" An Oracle White Paper Oracle Communications Jul. 2008. http://www.oracle.com/technetwork/middleware/weblogic/messaging/wlasm-1853193.pdf.

Bryan Che "Red Hat Enterprise MRG: Messaging, Realtime, and Grid" White paper, 2009 Red Hat, Inc #865344_1208 http://www.redhat.com/f/pdf/MRG_whitepaper_web.pdf.

Schull, Jonathan, Mike Axelrod, and Larry Quinsland. "Multichat: Persistent, Text-As-You-Type Messaging in a Web Browser for Fluid Multi-Person Interaction and Collaboration." System Sciences, 2006. HICSS'06. Proceedings of the 39th Annual Hawaii International Conference on. vol. 3. IEEE, 2006. http://citeseerx.ist.psu.edu/viewdoc/download?doi=10.1.1.92.357&rep=rep1&type=pdf.

Baecker, Ronald, et al. "Webcasting made interactive: Persistent chat for text dialogue during and about learning events." Human Interface and the Management of Information. Interacting in Information Environments. Springer Berlin Heidelberg, 2007. 260-268. http://vialab.dc-uoit.net/wordpress/wp-content/papercite-data/pdf/bae2007a.pdf.

* cited by examiner

| GROUP ID | OWNER | URL | STATUS | KEYWORDS |
|----------|-------|--------|--------|----------|
| GROUP 1 | USER 1 | http://... | ACTIVE | A, B, C |
| GROUP 2 | USER 2 | http://... | IDLE | D, E, F |
| GROUP 3 | USER 3 | http://... | IDLE | G, H, I |
| GROUP 4 | USER 4 | http://... | ACTIVE | J, K, L |
| GROUP 5 | USER 5 | http://... | ACTIVE | M, N, O |
| ... | ... | ... | ... | ... |
| GROUP N | USER N | http://... | ACTIVE | P, Q, R |

METHOD, COMPUTER-READABLE STORAGE DEVICE AND APPARATUS FOR ESTABLISHING PERSISTENT MESSAGING SESSIONS

This application is a continuation of U.S. patent application Ser. No. 14/092,848, filed Nov. 27, 2013, now U.S. Pat. No. 10,148,710, which is herein incorporated by reference in its entirety.

BACKGROUND

Videotelephony allows users in different locations to communicate in real time through the exchange of audio-video signals. With the rapid improvements and popularity of the Internet, videotelephony has become widespread through the deployment of video-enabled mobile phones, plus videoconferencing and computer webcams which utilize Internet telephony. For instance, many conventional large-scale videoconferencing systems utilize Integrated Services Digital Network (ISDN) or Internet Protocol (IP) transmission modes due to the need to convey the very large amounts of data generated by the endpoint devices' cameras and microphones. Such systems are often used by many participants in several different locations, all of whom can be viewed by every participant at each location. More modest systems rely on the use of personal computers, web or television cameras, and/or mobile devices (e.g., cellular telephones or smart phones) having integrated video cameras.

Current videotelephony systems operate under the assumption that a user invites a defined group of people to join a group or session, which exists only as long as users continue to participate in the group.

SUMMARY

In one embodiment, the present disclosure provides a method, computer-readable storage device, and apparatus for establishing persistent messaging sessions. One embodiment of a method for creating a persistent messaging session includes providing, by a server, a web application that enables browser-to-browser multimedia communications, creating, by the server, the persistent messaging session in response to a request from a user, and setting, by the server, the persistent messaging session to an idle state when all users have exited the persistent messaging session, wherein the idle state is monitored by the web application.

One embodiment of a method for joining a persistent messaging session includes querying, by a first endpoint device, a server hosting a web application that supports and tracks a plurality of persistent messaging sessions, using a set of search criteria, receiving, by the first endpoint device, a set of search results from the server, wherein the search results indicate that the persistent messaging session satisfies the set of search criteria, and joining, by the first endpoint device, the persistent messaging session, where the joining allows the first endpoint device to exchange browser-to-browser multimedia communications directly with a second endpoint device

BRIEF DESCRIPTION OF THE DRAWINGS

The essence of the present disclosure can be readily understood by considering the following detailed description in conjunction with the accompanying drawings, in which:

FIG. 5 illustrates an exemplary table that the database illustrated in FIG. 1 may use to track existing groups.

To facilitate understanding, identical reference numerals have been used, where possible, to designate identical elements that are common to the figures.

DETAILED DESCRIPTION

The present disclosure relates generally to videotelephony and relates more particularly to collaborative communications utilizing videotelephony. The present disclosure broadly discloses a method, a computer-readable storage device, and an apparatus for establishing persistent messaging sessions. Embodiments of the disclosure provide persistent groups that support various forms of digital communication (e.g., video, audio, and/or text chatting) via a standalone web application. By "persistent," it is meant that a group is substantially permanent. For instance, the group does not cease to exist just because no users are currently participating in the group; instead, the group remains in an idle state until a user once again seeks to participate in the group.

Any user can create and/or join a group, which may be established to connect users sharing a specific interest or goal, at any time. Groups are searchable using a discovery tool, which enables users to quickly locate groups related to their interests. As discussed above, when all users exit a group, the group is set to an idle state rather than deleted. This allows the group to be located by the discovery tool even when no users are currently participating in the group. When a user enters an idle group, the group is re-opened.

One benefit of the present method, computer-readable storage device, and apparatus is that users are not required to install specialized software in order to implement the embodiments of the present disclosure. The groups are hosted centrally (e.g., by a server, e.g., an application server), such that users are able to participate without installing specialized software; only a standard web browser is needed on the user side. This creates a seamless experience for users, regardless of the users' level of technological savvy.

Embodiments of the disclosed method, computer-readable storage device, and apparatus can be used to enhance employee productivity by providing a cost effective method for employees to speak face to face and in real time, no matter where the employees are individually located. Professors may also use embodiments of the disclosed method, computer-readable storage device, and apparatus to establish "virtual" office hours with students or groups of students that they are otherwise unable to meet with in person. Open Source communities may use embodiments of the disclosed method, computer-readable storage device, and apparatus to collaborate in real time and to enhance the connections that may have already been established through face to face communications.

Figure 1:
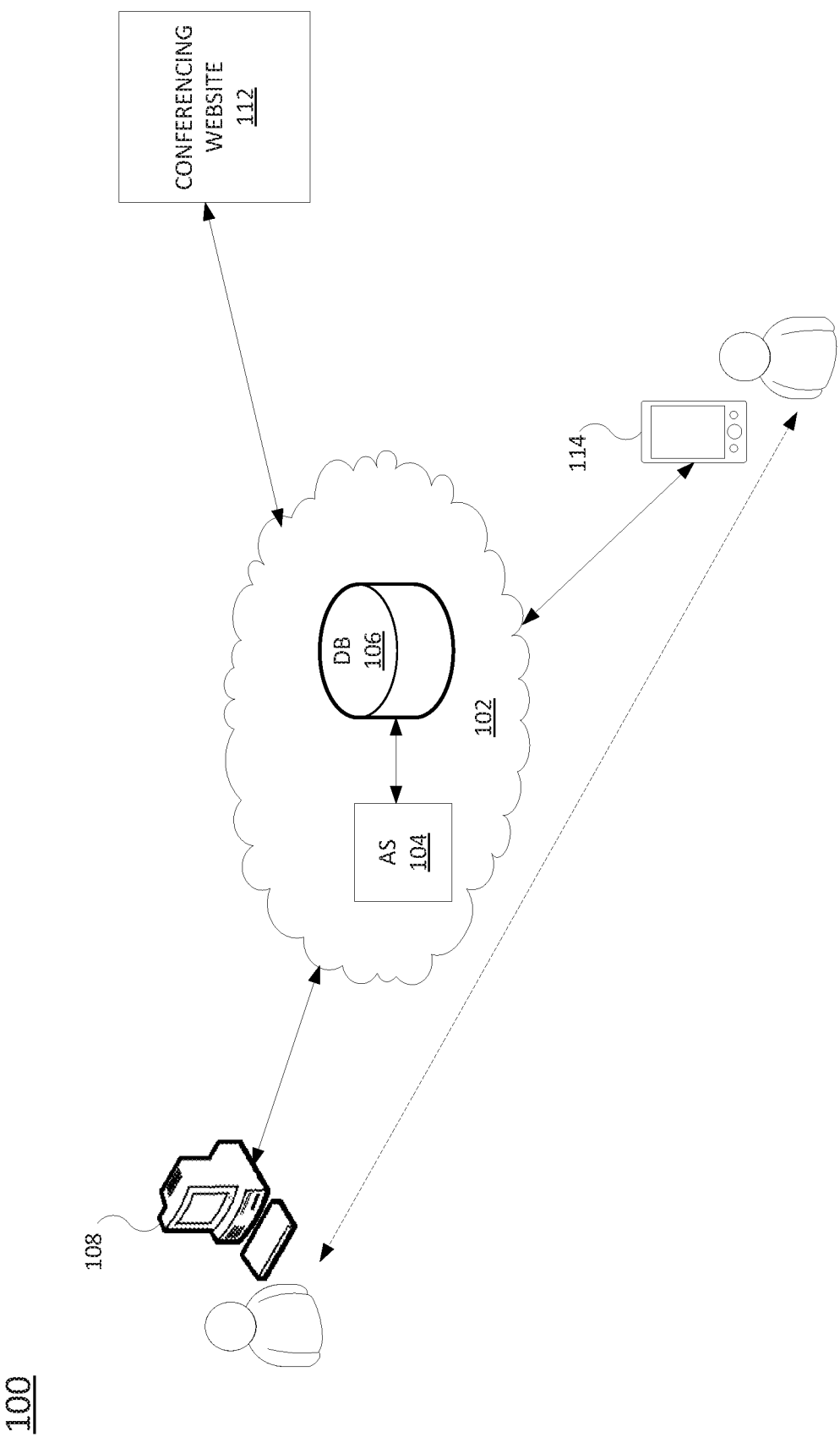
FIG. 1 illustrates one example of a communications network of the present disclosure.

FIG. 1 is a block diagram depicting one example of a communications network 100. The communications network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

In one embodiment, the communications network 100 may include a core network 102. The core network 102 may include an application server (AS) 104 and a database (DB) 106. The AS 104 may be deployed as a hardware device embodied as a general purpose computer (e.g., the general purpose computer 600 illustrated in FIG. 6). In one embodiment, the AS 104 may perform the methods and functions described herein (e.g., the methods 200, and 300 as discussed below). In one embodiment, a plurality of application servers similar to the AS 104 may be deployed; for instance, dedicated servers can be deployed for some of the persistent groups in order to avoid use conflicts (e.g., institutional users such as hospitals, universities, businesses, and the like may prefer to use private servers that only authenticated users can access).

In one embodiment, the DB 106 may store data related to the persistent messaging groups being hosted by the AS 104. For instance, the DB 106 may store for each group a unique identifier, a searchable handle, the current activity status (e.g., active or idle), the current "owner" of the group, a URL to the current session of the group, and/or other group-specific data. This data may be used by a discovery tool to enable searching of the available groups.

In one embodiment, the communications network 100 may include one or more access networks (e.g., a cellular network, a wireless network, a wireless fidelity (Wi-Fi) network, a PSTN network, an IP network, and the like) that are not shown to simplify FIG. 1. In one embodiment, the communications network 100 in FIG. 1 is simplified and it should be noted the communications network 100 may also include additional network elements (not shown), such as for example, border elements, gateways, firewalls, routers, switches, call control elements, various application servers, and the like.

In one embodiment, a user on an endpoint device 108 may view a conferencing portal or website 112 via the core network 102. The endpoint device 108 may be any type of endpoint device, e.g., a desktop computer, a laptop computer, a tablet computer, a netbook computer, a cellular telephone, a smart phone, or the like, having a messaging capability, e.g., text messaging, Short Message Service (SMS) messaging, Multimedia Messaging Service (MMS) messaging, instant messaging, or video messaging capability. The endpoint device 108 may be deployed as a hardware device embodied as a general purpose computer (e.g., the general purpose computer 600 illustrated in FIG. 6). In one embodiment, the endpoint device 108 may perform the methods and functions described herein (e.g., the method 400 discussed below).

In one embodiment, the conferencing website 112 may be in communication with the core network 102 and the AS 104. The AS 104 may provide the conferencing website with information relating to persistent groups that a user may join (e.g., information about interests to which the groups are related, the names of the groups, the users who "own" the groups, etc.). In one embodiment, the website 112 implements a standalone application that does not require the endpoint device 108 to install any specialized software aside from a standard web browser. In one embodiment, the website 112 utilizes the Web Real-Time Communication (WebRTC) application programming interface (API) definition, which enables browser-to-browser applications for voice calling, video chat, and peer-to-peer (P2P) file sharing without plugins.

In one embodiment, a user interface allows a user viewing the conferencing website 112 using the endpoint device 108 to exchange communications (e.g., text, audio, and/or video messages) on the conferencing website 112 with another user viewing the conferencing website 112 on another endpoint device 114. Like the endpoint device 108, the endpoint device 114 may be any type of endpoint device capable of sending and receiving messages.

It should be noted that although only two endpoint devices 108 and 114 are illustrated, any number of endpoint devices may be deployed. That is, any number of users may participate in any number of groups or sessions supported by the communications network 100.

Figure 2:
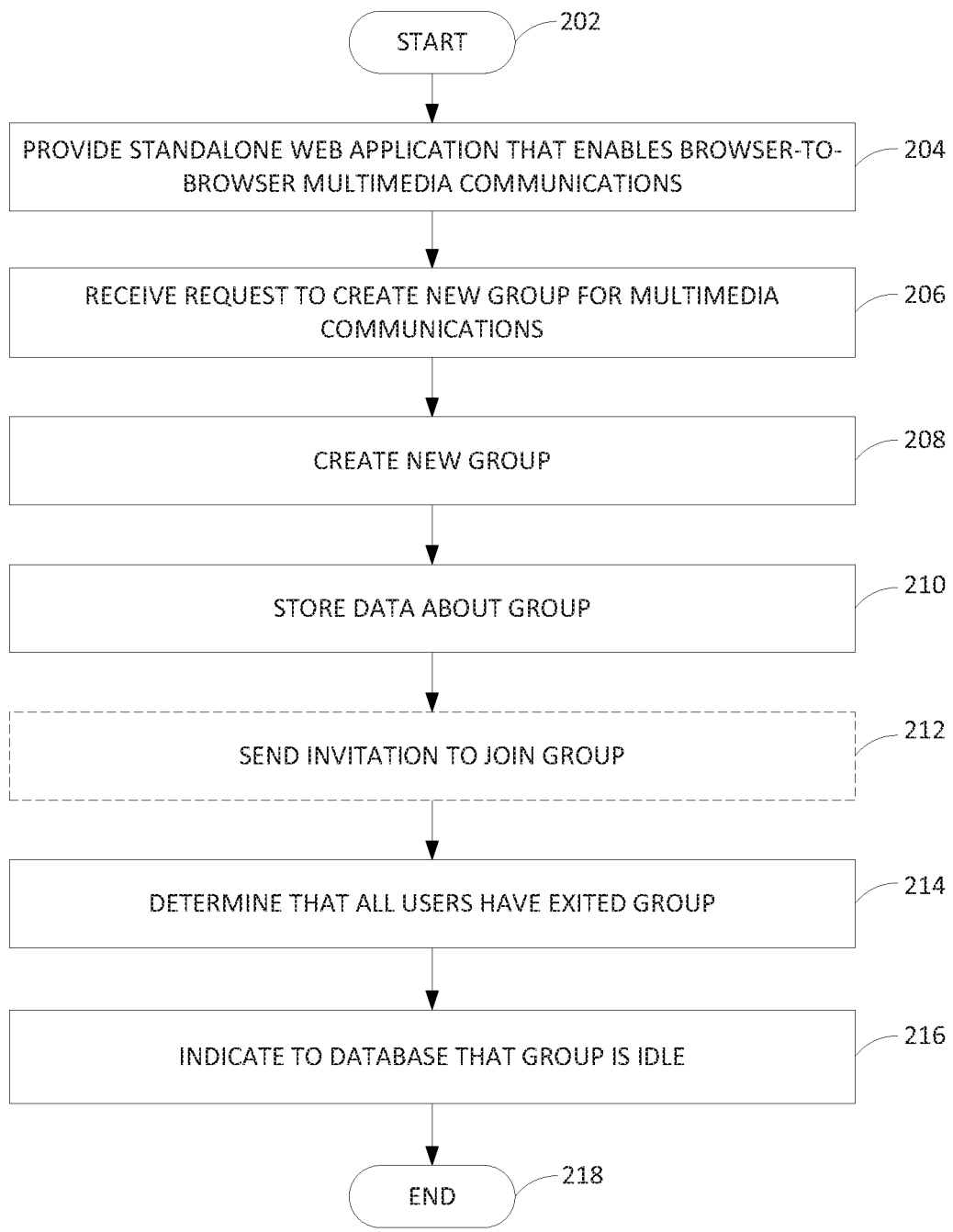
FIG. 2 illustrates a flowchart of a method creating a persistent messaging session.
Figure 6:
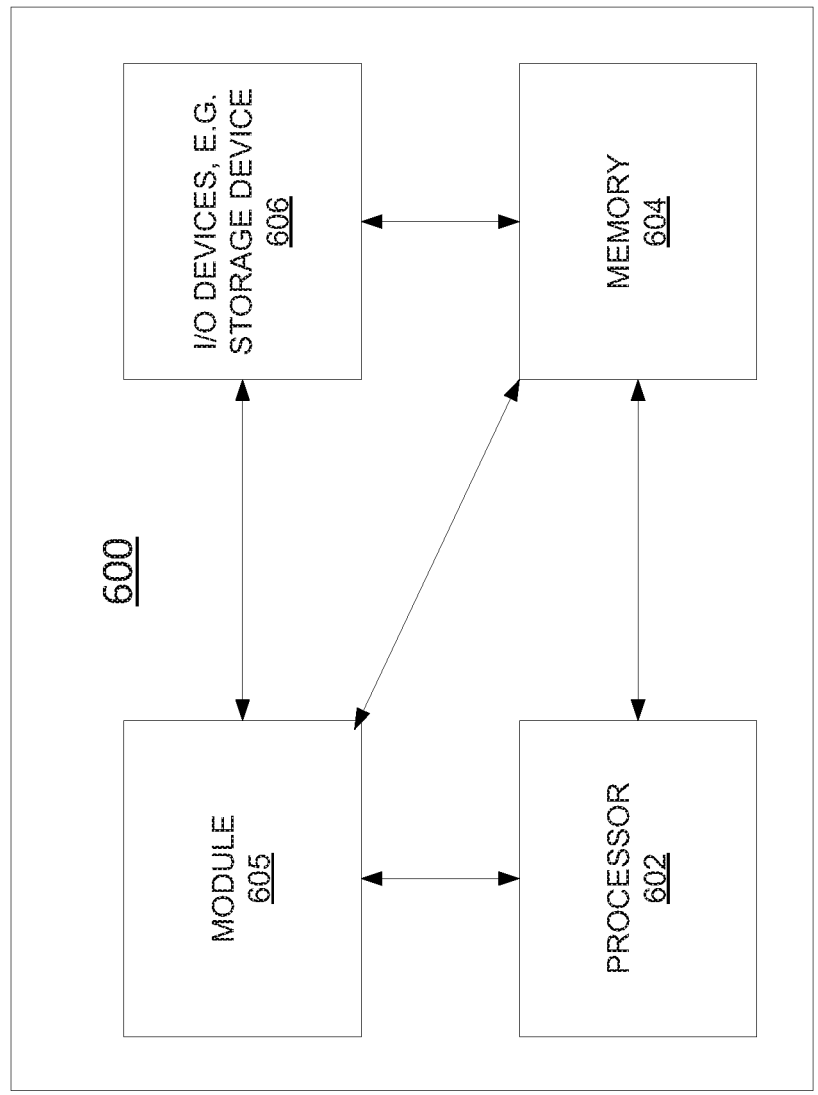
FIG. 6 illustrates a high-level block diagram of a general-purpose computer suitable for use in performing the functions described herein.

FIG. 2 illustrates a flowchart of a method 200 for creating a persistent messaging session. In one embodiment, the method 200 may be performed by the AS 104 or a general purpose computer as illustrated in FIG. 6 and discussed below. For purposes of illustration, the discussion of the method 200 makes reference to the AS 104.

The method 200 begins at step 202. In step 204, the AS 104 provides a standalone web application that enables browser-to-browser multimedia communications (e.g., voice calling, video chat, and/or P2P file sharing). In one embodiment, the web application utilizes the WebRTC API definition.

In step 206, the AS 104 receives a request from a user to create a new group. In step 208, the AS 104 creates the new group. In one embodiment, this includes assigning a unique identifier (e.g., a name, an alphanumeric string and the like) to the new group. In one embodiment, the unique identifier is provided by the user who requested creation of the new group, who is now designated as the "owner" of the group. In a further embodiment, creation of the new group also includes the creation of a searchable handle that allows other users to find the new group using a discovery tool. The searchable handle, like the identifier, may be provided by the user who requested the creation of the new group.

In step 210, the AS 104 sends data about the group to the DB 106. In one embodiment, the data sent to the DB 106 includes the identity of the current owner of the group, a uniform resource locator (URL) to the current session of the group, and/or the unique identifier associated with the group. FIG. 5, for example, illustrates an exemplary table 500 that the DB 106 may use to track existing groups.

In optional step 212 (illustrated in phantom) the AS 104 sends an invitation to join the group to at least one other user (i.e., other than the user who created the group). In one embodiment, the invitation is sent at the request of the user who created the new group.

In step 214, the AS 104 determines that all users have exited the group (i.e., there are no users currently exchanging messages through the group).

In step 216, the AS 104 indicates to the DB 106 that the group is now "idle" (i.e., no users are currently participating). An idle designation still allows the group to appear in search results. The method 200 ends in step 218.

Figure 3:
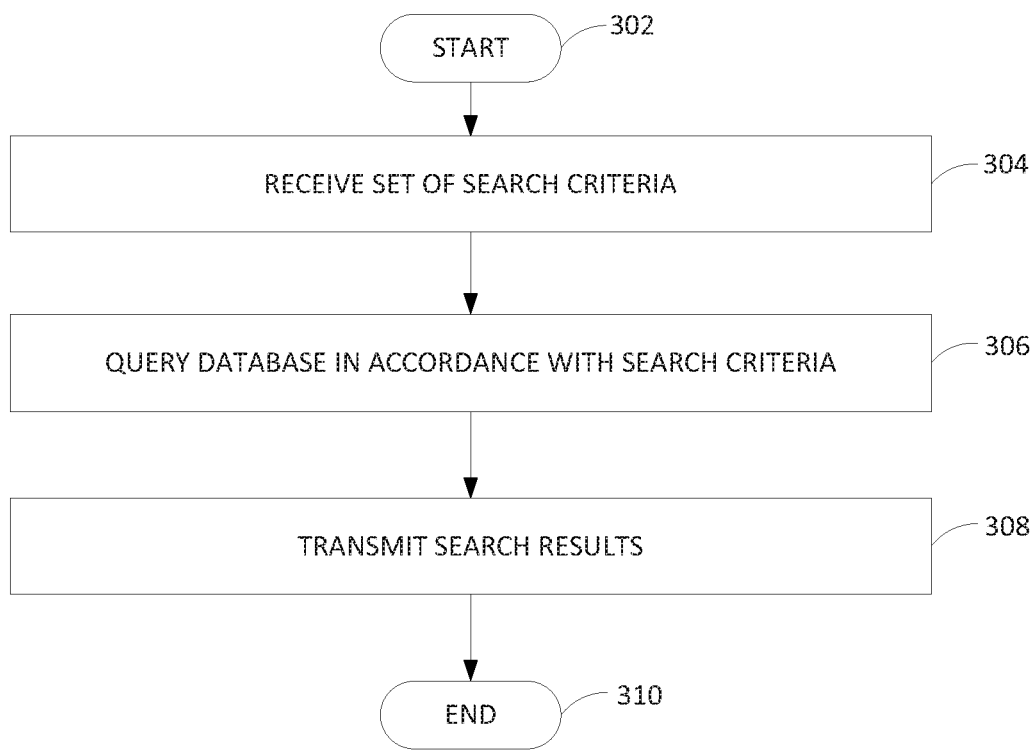
FIG. 3 illustrates a flowchart of a method for joining a persistent messaging session.

FIG. 3 illustrates a flowchart of a method 300 for joining a persistent messaging session. In one embodiment, the method 300 may be performed by the AS 104 or a general purpose computer as illustrated in FIG. 6 and discussed below. For purposes of illustration, the discussion of the method 300 makes reference to the AS 104.

The method 300 begins in step 302. In step 304, the AS 104 receives a set of search criteria from an endpoint device (e.g., endpoint device 108). The set of search criteria may comprise, for example, one or more keywords relating to groups for which the user of the endpoint device is interested in searching.

In step 306, the AS 104 queries the database for groups matching the search criteria. For example, if the search criteria include keywords, the keywords might match the searchable handles for one or more existing groups.

In step 308, the AS 104 transmits any matching groups as search results to the endpoint device. As discussed in further detail below, the user of the endpoint device may then decide to join one or more of the groups identified in the search results. The method 300 ends in step 310.

Figure 4:
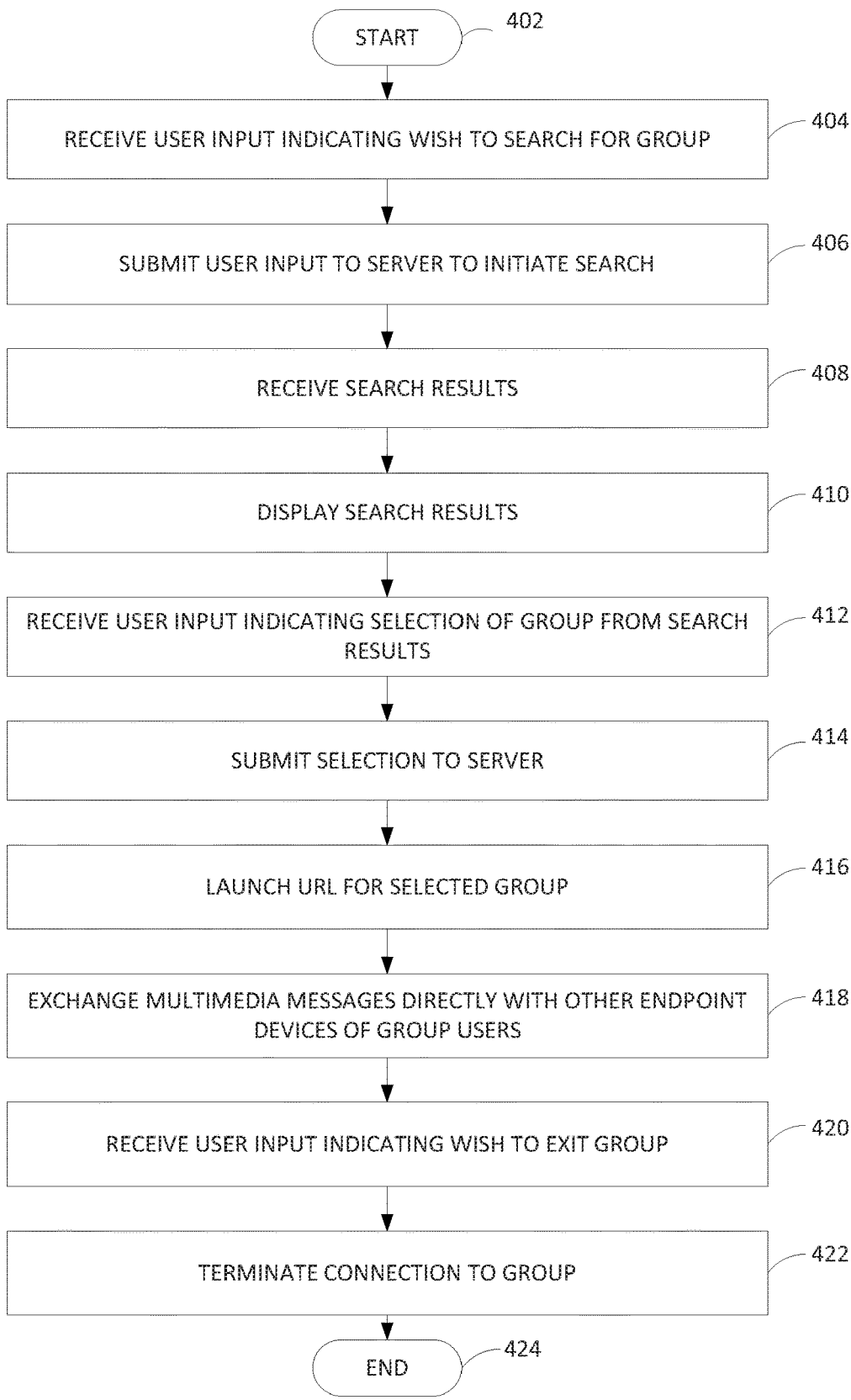
FIG. 4 illustrates a flowchart of another method for joining a persistent messaging session.

FIG. 4 illustrates a flowchart of another method 400 for joining a persistent messaging session. In one embodiment, the method 400 may be performed by the endpoint devices 108 or 114 or a general purpose computer as illustrated in FIG. 6 and discussed below. For purposes of illustration, the discussion of the method 400 makes reference to the endpoint device 108.

The method 400 begins in step 402. In step 404, the endpoint device 108 receives a user input indicating that a user of the endpoint device 108 wishes to search for a persistent messaging group or session. For instance, in one embodiment, the user may navigate to the website 112 using a web browser running on the endpoint device 108 and may enter one or more keywords in a search field.

In step 406, the endpoint device 108 submits the user input to the AS 104 to initiate a search for persistent messaging groups that satisfy the search criteria specified in the user input.

In step 408, the endpoint device 108 receives search results from the AS 104. In one embodiment, the search results comprise a plurality of URLs to persistent messaging groups that match the search criteria specified in the user input. In one embodiment, the URLs include both active groups (i.e., groups in which at least one other user is currently participating) and idle groups (i.e., groups in which no other users are currently participating).

In step 410, the endpoint device 108 displays the search results to the user. In step 412, the endpoint device 108 receives a user input indicating a selection by the user of one of the groups identified in the search results. For instance, the user may click on (or otherwise indicate selection of) the URL for a particular group. In step 414, the endpoint device 108 submits the selection to the AS 104.

In step 416, the endpoint device 108, in conjunction with the AS 104, launches the URL for the selected group, thereby allowing the user to communicate with other users of the selected group in real time. In one embodiment, if the group was idle prior to the user joining, then the user is designated as the new "owner" of the group for the purposes of tracking the session.

In step 418, the endpoint device 108 directly exchanges multimedia messages (e.g., voice calling, video chat, and/or P2P file sharing) with endpoint devices operated by the other users (i.e., in a browser-to-browser manner), without requiring the use of a centralized server such as the AS 104. In one embodiment, the messages are exchanged as WebRTC streams.

In step 420, the endpoint device 108 receives a user input indicating that the user wishes to exit the persistent messaging group. For instance, the user may click on (or otherwise indicate selection of) a button that indicates the user's wish to exit.

In step 422, the endpoint device 108 terminates the user's connection to the persistent messaging group. The method 400 then ends in step 424.

FIG. 6 depicts a high-level block diagram of a general-purpose computer suitable for use in performing the functions described herein. As depicted in FIG. 6, the system 600 comprises one or more hardware processor elements 602 (e.g., a central processing unit (CPU), a microprocessor, or a multi-core processor), a memory 604, e.g., random access memory (RAM) and/or read only memory (ROM), a module 605 for establishing persistent messaging sessions, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for establishing persistent messaging sessions (e.g., a software program comprising computer-executable instructions) can be loaded into memory 604 and executed by hardware processor element 602 to implement the steps, functions or operations as discussed above in connection with the exemplary methods 200, 300, and 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for establishing persistent messaging sessions (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating a persistent messaging session, the method comprising:
   providing, by a server, a web application that enables browser-to-browser multimedia communications via the persistent messaging session between a plurality of users comprising at least a first user and a second user;
   creating, by the server, the persistent messaging session in response to a request from the first user, wherein the creating comprises:
      assigning to the persistent messaging session a unique identifier;
      assigning to the persistent messaging session a searchable handle that allows the persistent messaging session to be located; and
      storing the unique identifier and the searchable handle in a database;
   setting, by the server, the persistent messaging session to an idle state when all users of the plurality of users have exited the persistent messaging session, wherein the idle state is monitored by the web application, wherein the idle state allows the persistent messaging session to be discovered even when the idle state indicates that no users of the plurality of users are currently participating in the persistent messaging session;
   receiving, by the server, a search criterion from a third user;
   determining, by the server, based on a database query, that the persistent messaging session satisfies the search criterion;
   identifying, by the server, the persistent messaging session to the third user in a search result;
   receiving, by the server, a selection by the third user to join the persistent messaging session; and
   joining, by the server, the third user to the persistent messaging session, wherein the third user is distinct from the plurality of users.

2. The method of claim 1, wherein the browser-to-browser multimedia communications utilize a web real time communication application programming interface definition.

3. The method of claim 1, wherein the browser-to-browser multimedia communications include video chat.

4. The method of claim 1, further comprising:
   storing a uniform resource locator to a current session of the persistent messaging session in the database, along with the unique identifier and the searchable handle.

5. The method of claim 1, further comprising:
   sending an invitation to join the persistent messaging session to the second user.

6. The method of claim 1, wherein the search criterion comprises a keyword.

7. The method of claim 1, wherein the search result includes a uniform resource locator to a current session of the persistent messaging session.

8. The method of claim 1, wherein the server is dedicated for use by a specific group of users.

9. The method of claim 1, wherein the persistent messaging session is searchable by a discovery tool when set to the idle state.

10. A non-transitory computer-readable storage device storing a plurality of instructions which, when executed by a processor of a server, cause the processor to perform operations for creating a persistent messaging session, the operations comprising:
   providing a web application that enables browser-to-browser multimedia communications via the persistent messaging session between a plurality of users comprising at least a first user and a second user;
   creating the persistent messaging session in response to a request from the first user, wherein the creating comprises:
      assigning to the persistent messaging session a unique identifier;
      assigning to the persistent messaging session a searchable handle that allows the persistent messaging session to be located; and
      storing the unique identifier and the searchable handle in a database;
   setting the persistent messaging session to an idle state when all users of the plurality of users have exited the persistent messaging session, wherein the idle state is monitored by the web application, wherein the idle state allows the persistent messaging session to be discovered even when the idle state indicates that no users of the plurality of users are currently participating in the persistent messaging session;
   receiving a search criterion from a third user;
   determining based on a database query, that the persistent messaging session satisfies the search criterion;
   identifying the persistent messaging session to the third user in a search result;
   receiving a selection by the third user to join the persistent messaging session; and
   joining the third user to the persistent messaging session, wherein the third user is distinct from the plurality of users.

11. The non-transitory computer-readable storage device of claim 10, wherein the browser-to-browser multimedia communications utilize a web real time communication application programming interface definition.

12. The non-transitory computer-readable storage device of claim 10, wherein the browser-to-browser multimedia communications include video chat.

13. The non-transitory computer-readable storage device of claim 10, the operations further comprising:
   storing a uniform resource locator to a current session of the persistent messaging session in the database, along with the unique identifier and the searchable handle.

14. The non-transitory computer-readable storage device of claim 10, the operations further comprising:
sending an invitation to join the persistent messaging session to the second user.

15. A system for joining a persistent messaging session, the system comprising:
a processor of a third endpoint device of a third user; and
a computer-readable storage device storing a plurality of instructions which, when executed by the processor, cause the processor to perform operations, the operations comprising:
querying using a search criterion, a server hosting a web application that supports and tracks a plurality of persistent messaging sessions, the plurality of persistent messaging sessions comprising the persistent messaging session between a plurality of users comprising at least a first user of a first endpoint device and a second user of a second endpoint device, wherein the persistent messaging session is in an idle state when all users of the plurality of users have exited the persistent messaging session, wherein the idle state is monitored by the web application, wherein the idle state allows the persistent messaging session to be discovered even when the idle state indicates that no users of the plurality of users are currently participating in the persistent messaging session, wherein the search criterion comprises a searchable handle, wherein the server stores a unique identifier and the searchable handle in a database of the plurality of persistent messaging sessions;
receiving a search result from the server, wherein the search result indicates that the persistent messaging session satisfies the search criterion;
sending a selection to join the persistent messaging session; and
joining the persistent messaging session, where the joining allows the third endpoint device to exchange browser-to-browser multimedia communications directly with at least one of the first endpoint device or the second endpoint device, wherein the third user is distinct from the plurality of users.

16. The system of claim 15, wherein the browser-to-browser multimedia communications utilize a web real time communication application programming interface definition.

17. The system of claim 15, wherein the browser-to-browser multimedia communications include video chat.

18. The system of claim 15, wherein the search criterion comprises a keyword.

19. The system of claim 15, wherein the search result includes a uniform resource locator to a current session of the persistent messaging session.

20. The system of claim 15, wherein the server is dedicated for use by a specific group of users.

* * * * *